H. K. HITCHCOCK.

MANUFACTURE OF GLASS PLATES OR SHEETS.

APPLICATION FILED APR. 3, 1916.

Reissued May 7, 1918.

14,468.

3 SHEETS—SHEET 1.

WITNESSES

W. T. Hohman

G. H. Lerenke

INVENTOR

Halbert K. Hitchcock,

By Frank N. Mueller,

Attorney.

H. K. HITCHCOCK.

MANUFACTURE OF GLASS PLATES OR SHEETS.

APPLICATION FILED APR. 3, 1916.

Reissued May 7, 1918.

14,468.

3 SHEETS—SHEET 2.

WITNESSES

W. T. Hohman

J. H. Lerescher

INVENTOR

Halbert K. Hitchcock,

By Frederick W. Miles

Attorney.

H. K. HITCHCOCK.

MANUFACTURE OF GLASS PLATES OR SHEETS.

APPLICATION FILED APR. 3, 1916.

Reissued May 7, 1918.

14,468.

3 SHEETS—SHEET 3.

WITNESSES

W. T. Holman

G. H. Lerenke

INVENTOR

Halbert K. Hitchcock,

By Frank N. Wilcox,

Attorney.

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

MANUFACTURE OF GLASS PLATES OR SHEETS.

14,468. Specification of Reissued Letters Patent. Reissued May 7, 1918.

Original No. 1,128,448, dated February 16, 1915, Serial No. 275,462, filed August 23, 1905. Application for reissue filed April 3, 1916. Serial No. 88,747.

*To all whom it may concern:*

Be it known that I, HALBERT K. HITCHCOCK, now residing at Pittsburgh, in the county of Allegheny and State of Pennsylvania, a citizen of the United States, have invented or discovered certain new and useful Improvements in the Manufacture of Glass Plates or Sheets, of which improvements the following is a specification.

The invention described herein relates to certain improvements in apparatus for the practice of the method described in my Patent No. 805,065, dated November 21, 1905, and the invention consists generally stated, in providing means whereby glass in a plastic condition is fed to a formative point and whereby a formative tension is applied to the glass when it reaches such point.

The invention also consists in providing suitable means whereby the temperature of the glass can be regulated while flowing to and at the formative point and also while being subjected to the formative tension.

The invention is hereinafter more fully described and claimed.

Figure 1:
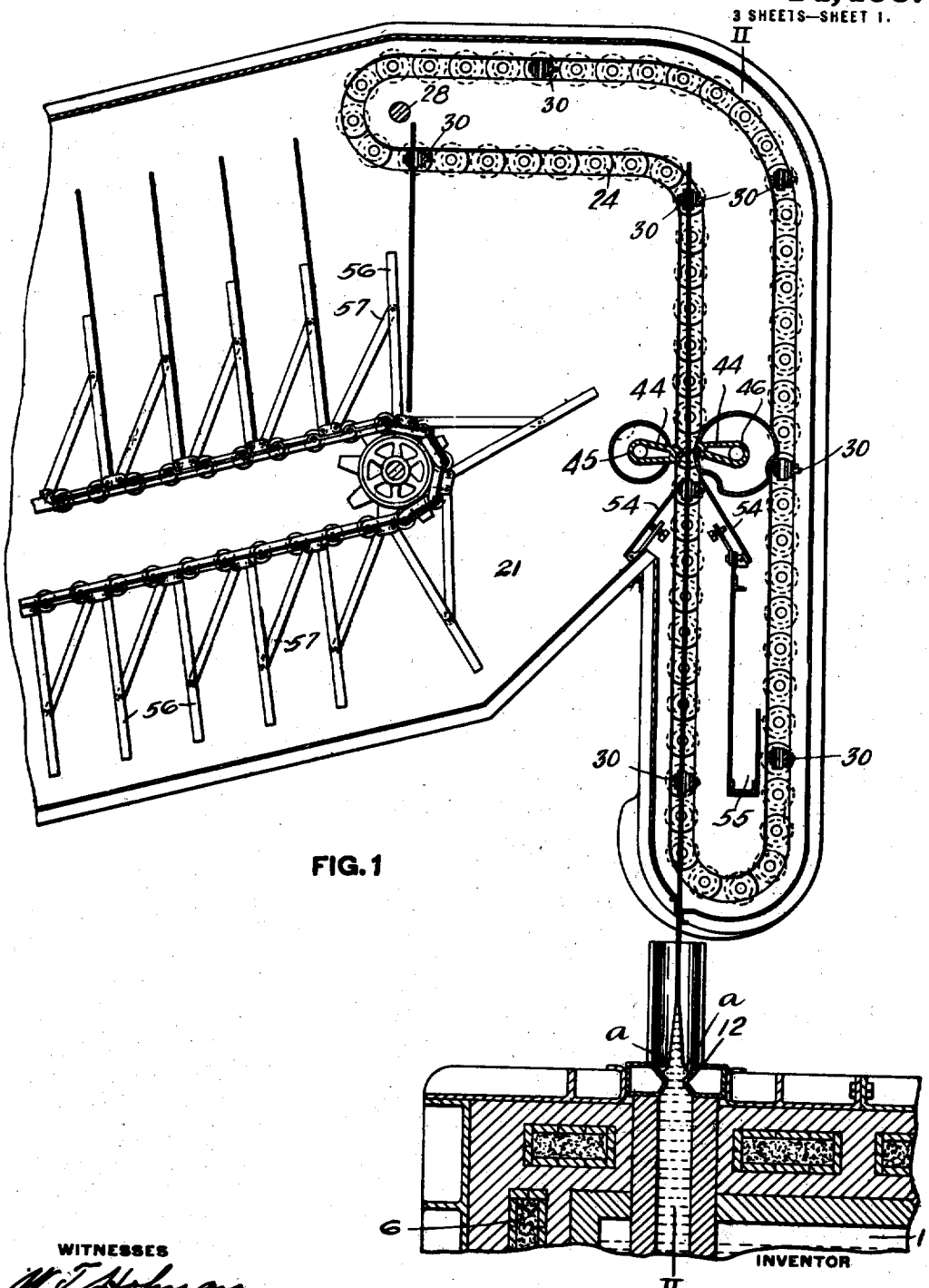
Figure 2:
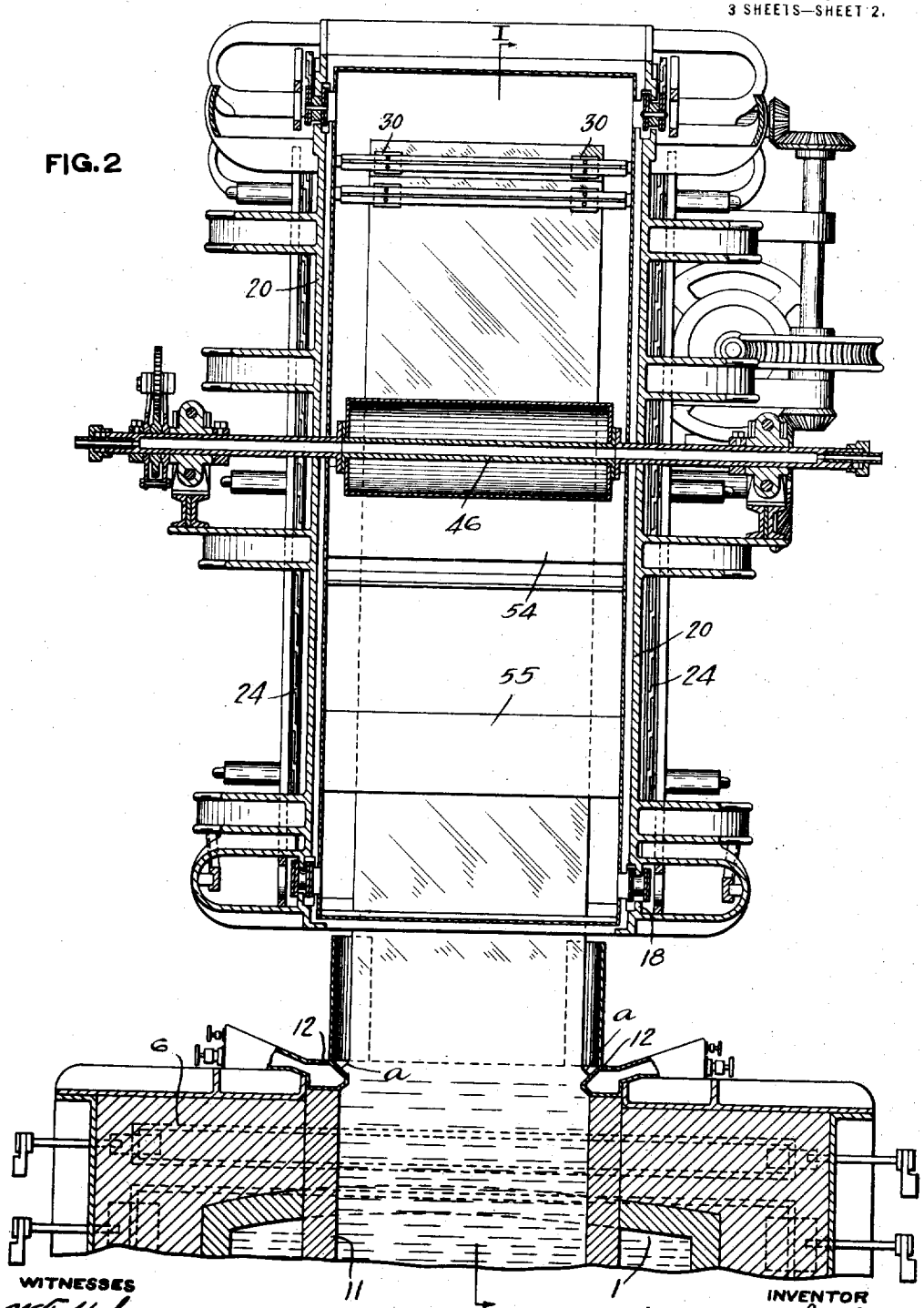
Figure 3:
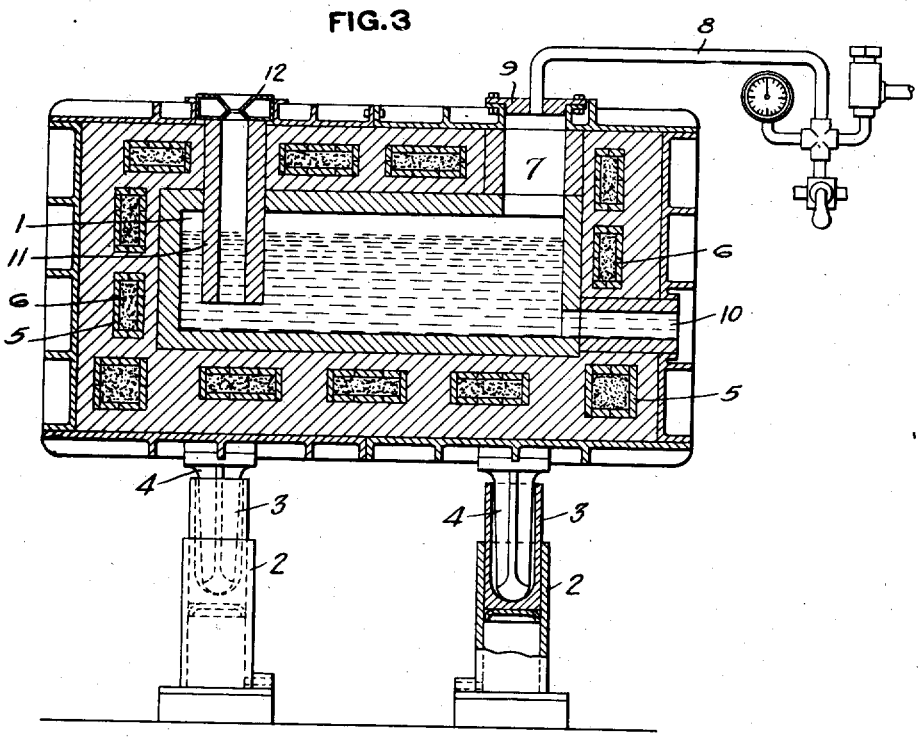
Figure 4:
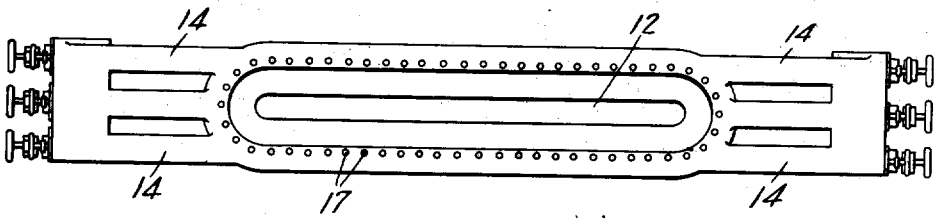
Figure 5:
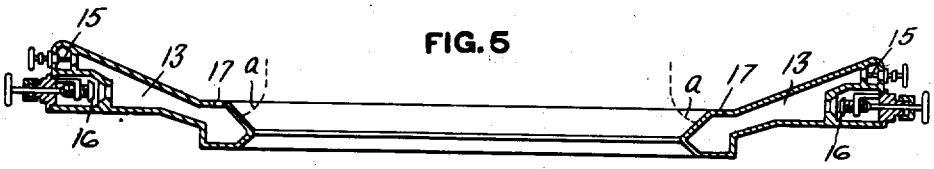

In the accompanying drawings forming a part of this specification, Figure 1 is a sectional elevation of a portion of my improved apparatus for the manufacture of glass sheets, the plane of section being indicated by the line I—I, Fig. 2; Fig. 2 is a sectional elevation on a plane indicated by the line II—II, Fig. 1; Fig. 3 is a sectional elevation of a glass retaining receptacle from which the glass is fed in the formation of the sheets; and Figs. 4 and 5 are a top plan and a sectional elevation, respectively, of the slot or opening through which the glass is fed in the formation of the sheets.

In the practice of my invention it is preferred that the glass from which the sheets are to be formed should be charged into a receptacle provided with suitable means for maintaining the glass at the desired temperature. A desirable construction consists of a chamber or receptacle 1 formed of heat resisting material held in position by a metal shell. For purposes of adjustment hereinafter described it is preferred to provide for a vertical adjustment and leveling of the receptacle. A convenient means for this purpose consists of fluid pressure cylinders 2 provided with rams 3 having sockets in their upper ends for the reception of legs 4 secured at their upper ends to the basin or receptacle. As shown in Fig. 3 the legs are somewhat smaller than the sockets in the pistons and have their lower ends rounded so that the legs may have a slight rocking movement within the sockets. While any suitable means may be employed for heating the receptacle it is preferred to employ electrical means such as shown, as permitting a better control of the temperature. A desirable construction of such heaters consists of a series of shells 5, extending through the masonry forming the receptacle and preferably formed of siloxicon or carborundum. These shells or casings inclose cores 6 formed of pulverized or granulated carbon or other suitable material and connected by suitable electrodes and terminals to an electric generator, the current from which is regulated by suitable means well known in the art. By suitably arranging these electric heaters around and in the walls of the receptacle any desired temperature may be maintained in different parts or entirely throughout the receptacle. While the receptacle may be charged through the opening through which the glass is subsequently to be fed, it is preferred to employ an independent inlet 7 for that purpose and when the apparatus is in operation fluid pressure is maintained on the surface of the glass in the chamber 1, preferably by means of a pipe 8 passing through the cap or cover of the inlet 7. For removing glass which cannot be utilized in the forming of the sheets, an outlet 10 is provided in line with the bottom of the receptacle and adapted to be temporarily closed by any suitable means known in the art. When the glass is subjected to pressure it is forced up through a feed tube 11 projecting down nearly to the bottom of the receptacle so that all or nearly all the glass can be forced through the tube. The glass is directed by the tube to a "slot" 12 which is formed in a casting secured to the jaw of the receptacle in line with the feed tube.

The walls of the slot are made hollow so that air may be forced therethrough either cold or heated to regulate the temperature of the walls in contact with the glass as hereinafter described; or the temperature may be regulated by burning gas in the slot.

As shown the slot consists of a casting having an oblong opening or passage 12 therethrough, the walls of such casting being made hollow and connected with combustion chambers 13 at the ends of the castings. It is preferred that these combustion chambers should be connected with the chamber immediately around the slot or opening 12 by three or more branches 14, the outside branches being in line with the side chambers in the casting and the intermediate branches in line with the axis of the oblong opening. Gas and air are admitted into the combustion chambers through suitable ports controlled by valves 15 and 16, the ports being preferably arranged in line with the branches 14. In the top walls of the chambers are formed openings 17 for the escape of air or gases or products of combustion. It will be readily understood that by a proper adjustment of the valves 15 and 16 the temperature of the walls of the slot in contact with the glass as hereinafter described may be very accurately regulated.

At the beginning of the operation of forming sheets, the glass forced up through this slot 12 is engaged by a suitable bait whereby it may be drawn up until the glass itself can be caught by pulling clamps. After the clamps have thus engaged the sheet the feed and movement of the glass is continuous until the glass contained in the receptacle is exhausted or may be made without intermission if suitable means be provided whereby the glass can be fed into the receptacle without destroying the feeding pressure maintained therein.

The glass is pulled up into a head or end chamber 20 at one end of an annealing kiln or chamber 21, both of which preferably are lined with some suitable non-conducting material, as asbestos. For the purpose of applying suitable tension to the glass at the formative point, I provide endless drawing chains 24 which extend around sprocket wheels on a driven shaft 28 and are guided by slots 18 in the chamber walls, and which chains are provided with suitable clamps, indicated generally at 30, which catch the sheet and draw the same from the slot or orifice 12, suitable means being provided to cause said clamp to automatically clamp the sheet at the lower portion of the head or chamber 20 and to release the same at the upper portion of said head or chamber. The clamps are so arranged that during a portion of the drawing movement two clamps will be operated to effect the pulling. As any form of drawing mechanism for applying tension to the sheet at the formative point adjacent to the slot 12 will be suitable for my purpose, the details thereof are not illustrated and described.

In order to divide the sheet into sections, a suitable severing mechanism is employed. A suitable construction for this purpose consists of two wings 44 mounted on shafts 45 and 46, said shafts and portions of the wings 44 being hollow for the circulation therethrough of a medium for controlling the temperature of the edges of the wings. One of the shafts 45 or 46 will be provided with a sprocket wheel intermeshing with one of the chains 24, and the said shafts 45 and 46 will be connected by gearing so arranged and mounted as to rotate the blades or wings in unison and in opposite directions and permit of the adjustment of the shafts toward and from each other. The cracking of the glass by these wings can be effected if the glass is quite hot by having the edges of the wings cold, or, if the glass is cold at the time of severance, by heating the wings. The cutters or wings 44 are so located and operated that they will bear against opposite sides of a sheet just as a clamp begins to move along the curved portion of the head or to move laterally, so that in addition to the cracking action produced by the wings there will be a slight lateral movement of the sheet to assist in the severance of the section.

Shields 54 are arranged on opposite sides of the path of upward movement of the clamps, which will direct pieces of broken glass down into a pocket 55 in the pulling head or to the lower floor of the leer which is inclined as shown so that the broken pieces will slide out of the way. It is preferred that these plates should be made yielding or resilient so that their edges may come into close proximity to a sheet being drawn and will yet permit the clamps passing between them.

In order to move the sheets through the kiln 21, an endless chain is provided carrying a series of posts 56 braced and held in proper position by braces 57. After a section of the glass has been severed, it is carried along horizontally by the clamps and placed in position adjacent to one of the supporting posts 56, which are so timed as to be in proper position to receive and support the glass as the clamps carry it along. As the glass sections reach position where they are supported by the posts 56, the clamps are opened and the sheet allowed to move along with the endless chain through the kiln.

It will be understood that the function of the slot is principally directing the glass to and distributing it at the formative point. The slot also serves as an anchorage or abutment to which the outer portions of the glass passing through the slot will adhere, so that such surface portions will be subjected to a stretching action, as described in Letters Patent Nos. 805,064 and 805,065, dated November 21, 1905. The adherence of the glass will depend upon the temperature of the walls of the slot and the glass passing through the same. Both of these temperatures can be accurately adjusted and maintained by the constructions herein set forth.

Glass, while hot enough to be plastic, is diathermanous to radiant heat, and consequently the colder the exterior of the glass becomes the more diathermanous it becomes, so that the heat from the inner stream is not only conducted but is also radiated through the colder enveloping glass with comparatively great freedom and is absorbed by the enveloping walls, thus helping to keep the cooler envelop warm and prevent too great a difference of temperature between the inner and outer streams of glass.

By having the walls of the slot or orifice 12 flaring upwardly from its bottom or restricted portion, and having the level of the glass between the restricted lower portion of the orifice and its top, a radiating surface *a*, *a* is provided, which permits of the formation of the colder envelop having the action above described. Since the glass is being drawn away from the formative point practically at constant speed, and since the heat dissipating capacity of the orifice itself can be controlled by regulating its temperature by admitting a cooling or heating medium into its hollow walls, the heat dissipating capacity of the radiating surfaces *a*, *a* can be varied, as desired, and in that way the temperature of the glass at the formative point and while being subjected to the formative tension, can be accurately regulated so as to insure the proper stretching of the glass and the drawing of a sheet of substantially uniform thickness.

The position of the receptacle or basin can be easily adjusted so as to bring the "slot" into alinement with the plane of the upward movement of the clamps of the pulling mechanism. And, further, by raising and lowering the receptacle or basin, the glass cooling zone between the "slot" and the lower end of the heated chamber or pulling head can be increased or diminished, thereby regulating the temperature of the glass between the slot and pulling head. It will be understood that any suitable means can be employed for heating the kiln and pulling head and regulating the temperature in the different portions of the latter.

I claim herein as my invention:

1. An apparatus for the manufacture of glass having in combination a receptacle for molten glass, a drawing orifice, and means for drawing the glass upwardly from said orifice, said orifice having a peripherally continuous wall extending from within the glass to a plane above the glass level, the bottom opening of said orifice being of less area than its area at the glass level, and means for heating the orifice wall.

2. A glass drawing orifice having a peripherally continuous wall extending from within the glass to a plane above the glass level, said orifice being of gradually increasing area in successive planes from its bottom opening upwardly to the level of the glass, and means for heating the orifice wall.

3. A glass drawing orifice having a gradually increasing area upwardly from its bottom opening to its top and having the level of the glass below its top and above its most restricted area, whereby the surface from which the glass is withdrawn is of enlarged area to permit such surface to lose heat by radiation.

4. A glass drawing orifice having a gradually increasing area upwardly from its bottom opening to its top and having the level of the glass below its top and above its most restricted area, whereby the surface from which the glass is withdrawn is of enlarged area to permit such surface to lose heat by radiation, and means for heating the walls of said orifice.

5. A glass drawing orifice having increasing dimensions in the direction of flow of the glass through said orifice and having the level of the glass in said orifice below its top but above its bottom or restricted portion.

6. A glass drawing orifice having increasing dimensions in the direction of flow of the glass through said orifice and having the level of the glass in said orifice below its top but above its bottom or restricted portion, said orifice being so arranged that its walls are heated.

7. A glass drawing orifice having increasing dimensions upwardly in the direction of flow of the glass through said orifice and being partly submerged below the glass level and extending above said glass level.

8. A glass drawing orifice flaring upwardly and having its restricted lower portion submerged below the glass level and its upper enlarged portion extending above said glass level.

9. An apparatus for the manufacture of glass having in combination a receptacle for the molten glass, a drawing orifice, and means for drawing the glass upwardly from said orifice, said orifice having a peripherally continuous wall extending from within the glass to a plane above the glass level and having a restricted section and flaring upwardly to a plane above the level from which the glass is withdrawn, whereby the surface from which the glass is withdrawn is of enlarged area to permit such surface to lose heat by radiation.

10. An apparatus for the manufacture of glass having in combination a receptacle for the molten glass, a drawing orifice, and means for drawing the glass upwardly from said orifice, said orifice having a peripherally continuous wall extending from within the glass to a plane above the glass level and having a restricted section of a shape similar to the finished article and flaring upwardly to a plane above the level from which the glass is withdrawn, whereby the surface from which the glass is withdrawn is of enlarged area to permit such surface to lose heat by radiation.

11. An apparatus for the manufacture of glass having in combination a receptacle for the molten glass, a drawing orifice, means for drawing the glass upwardly from said orifice, said orifice having a peripherally continuous wall extending from within the glass to a plane above the glass level and having a restricted section and flaring upwardly to a plane above the level from which the glass is withdrawn, whereby the surface from which the glass is withdrawn is of enlarged area to permit such surface to lose heat by radiation, and means for regulating the temperature of the orifice wall.

12. An apparatus for the manufacture of glass having in combination a receptacle for the molten glass, a drawing orifice, means for drawing the glass upwardly from said orifice, said orifice having a peripherally continuous wall extending from within the glass to a plane above the glass level and having a restricted section of a shape similar to the finished article and flaring upwardly to a plane above the level from which the glass is withdrawn, whereby the surface from which the glass is withdrawn is of enlarged area to permit such surface to lose heat by radiation, and means for regulating the temperature of the orifice wall.

13. An apparatus for the manufacture of glass having in combination a receptacle for the molten glass, a drawing surface, means for drawing the glass upwardly from said orifice, said orifice having a peripherally continuous wall extending from within the glass to a plane above the glass level and flaring upwardly to a plane above the level from which the glass is withdrawn, whereby the surface from which the glass is withdrawn is of enlarged area to permit such surface to lose heat by radiation, and means for heating the orifice wall.

14. An apparatus for the manufacture of glass having in combination a receptacle for the molten glass, a drawing surface, means for drawing the glass upwardly from said orifice, said orifice having a peripherally continuous wall extending from within the glass to a plane above the glass level and having a restricted section of a shape similar to the finished article and flaring upwardly to a plane above the level from which the glass is withdrawn, whereby the surface from which the glass is withdrawn is of enlarged area to permit such surface to lose heat by radiation, and means for heating the orifice wall.

15. An apparatus for the manufacture of glass having in combination a receptacle for the molten glass, a drawing orifice, means for drawing the glass upwardly from said orifice, said orifice having a peripherally continuous wall extending from within the glass to a plane above the glass level and having a bottom inlet of less area than the surface from which the glass is withdrawn, and means for regulating the temperature of the orifice wall.

16. An apparatus for the manufacture of glass having in combination a receptacle for the molten glass, a drawing orifice, means for drawing the glass upwardly from said orifice, said orifice having a peripherally continuous wall extending from within the glass to a plane above the glass level and having a bottom inlet of less area than the surface from which the glass is withdrawn, and means for heating the orifice wall.

17. An apparatus for the manufacture of glass having in combination a receptacle for molten glass, a drawing orifice, means for drawing the glass upwardly from said orifice, said orifice having a peripherally continuous wall extending from within the glass to a plane above the glass level and being of increasing area from its bottom inlet upwardly to the level from which the glass is withdrawn, and means for regulating the temperature of the orifice wall.

18. An apparatus for the manufacture of glass having in combination a receptacle for molten glass, a drawing orifice, means for drawing the glass upwardly from said orifice, said orifice having a peripherally continuous wall extending from within the glass to a plane above the glass level and being of increasing area from its bottom inlet upwardly to the level from which the glass is withdrawn, and means for heating the orifice wall.

HALBERT K. HITCHCOCK.

Witnesses:
GLENN H. ZERESCHE,
A. E. JOHNSON.

Copies of this patent may be obtained for five cents each, by addressing the "Commissioner of Patents, Washington, D. C."